A. W. MARCILLE.
AUTOMATIC GAS CUT-OFF.
APPLICATION FILED OCT. 9, 1914.

1,155,257. Patented Sept. 28, 1915.

Witnesses
C. F. Rudolph
D. W. Gould

Inventor
Albert W. Marcille,
By Victor J. Evans
Attorney

UNITED STATES PATENT OFFICE.

ALBERT W. MARCILLE, OF THOROLD, ONTARIO, CANADA.

AUTOMATIC GAS CUT-OFF.

1,155,257. Specification of Letters Patent. Patented Sept. 28, 1915.

Application filed October 9, 1914. Serial No. 865,931.

*To all whom it may concern:*

Be it known that I, ALBERT W. MARCILLE, a subject of the King of Great Britain, residing at Thorold, in the Province of Ontario, Dominion of Canada, have invented new and useful Improvements in Automatic Gas Cut-Offs, of which the following is a specification.

The invention relates to an improvement in automatic gas cut offs, designed particularly to insure against passage of the gas beyond the control valve of the burner after light has been for any reason extinguished.

The main object of the present invention is the provision of an automatic gas extinguisher involving a locking means for holding the valve in open position, and means controlled thermostatically for operating the locking means to release the valve.

The invention in the preferred form of details will be described in the following specification, reference being had particularly to the accompanying drawings, in which:—

Figure 1:
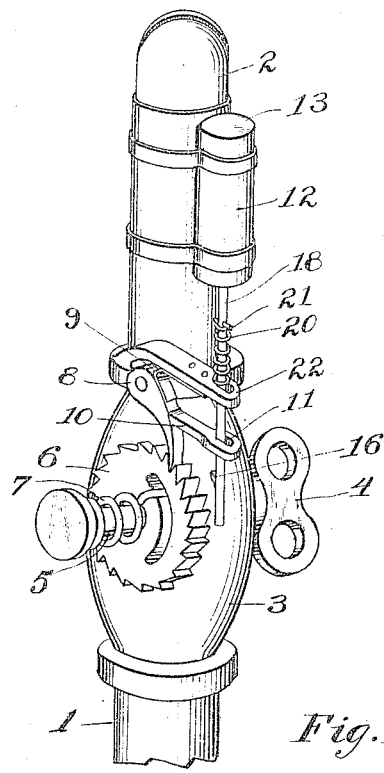
Figure 2:
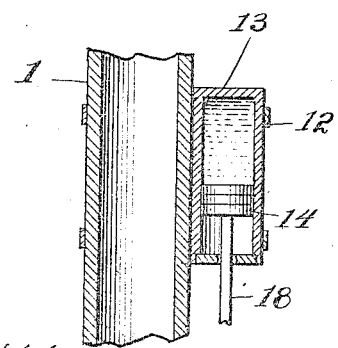

Figure 1 is a perspective view illustrating the improvement. Fig. 2 is a section on line 2—2 of Fig. 1.

In constructing the improved device, the gas service pipe 1 adjacent the burner 2 is provided with a cut-off or valve 3, operated through the medium of the usual handle 4, the valve stem 5 being projected through and beyond the pipe 1 and provided with a ratchet 6, being also engaged by a coil spring 7 terminally secured and so tensioned as to normally close the valve when free to act. Supported on the pipe 1 is a dog 8 spring pressed through the medium of the spring 9 to maintain a locking engagement with the ratchet 6, whereby to lock the ratchet in position to maintain the valve open to a degree set by the handle 4. The dog has a vertical projection 10 terminating in an eye 11.

Secured upon the pipe 1 is a reservoir 12, preferably in the form of a pipe like member, closed at one end as at 13 and supported longitudinally of and in parallelism with the pipe 1. A plunger or piston 14 is slidably mounted in the reservoir, maintaining close contact therewith and providing between the end 15 of such piston and the closed end of the reservoir, a chamber to contain a heat expanding fluid, as mercury or the like. A rod 18 is secured to and projecting beyond the end of the piston 14 and through the eye 11, being formed with one or more teeth 16 adapted in movement of the rod in one direction to engage the wall of the eye, as will be evident. A spring 20 encircles the rod 18, bearing between a stop 21 thereon and the fixed stop 22 secured to the pipe 1.

In operation, the valve 3 is opened and locked in open position by the dog 8, the teeth 16 being manually released from the wall of the eye. As the expansive fluid becomes heated, it advances the piston and rod 18 so that the tooth rides over and is arranged beyond the wall of the eye toward the valve 3. If the light becomes extinguished for any reason, the cooling of the expansive fluid permits the spring 20 to return the plunger or piston and rod with the effect to cause the tooth 16 to engage the wall of the eye and withdraw the dogs 8 from coöperation with the ratchet 6, thereby permitting the spring 7 to close the valve.

What is claimed is:—

A gas extinguisher including a controlling valve, a dog for locking the valve in open position, an expansible liquid holding chamber arranged in proximity to the gas burner, a piston in said chamber, a rod projecting from the piston, a projection extending from the dog and terminally formed with an eye to permit the passage of the rod therethrough, said rod below the eye being formed with a tooth, the eye being elongated to permit lateral play of the rod to disengage the tooth and projection in the initial setting of the device.

In testimony whereof I affix my signature in presence of two witnesses.

ALBERT W. MARCILLE.

Witnesses:
C. J. HOOCHBANK,
T. F. BATTLE.